Figure 13:
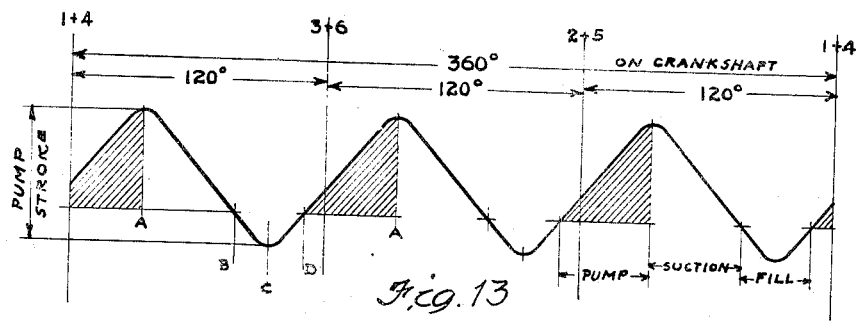

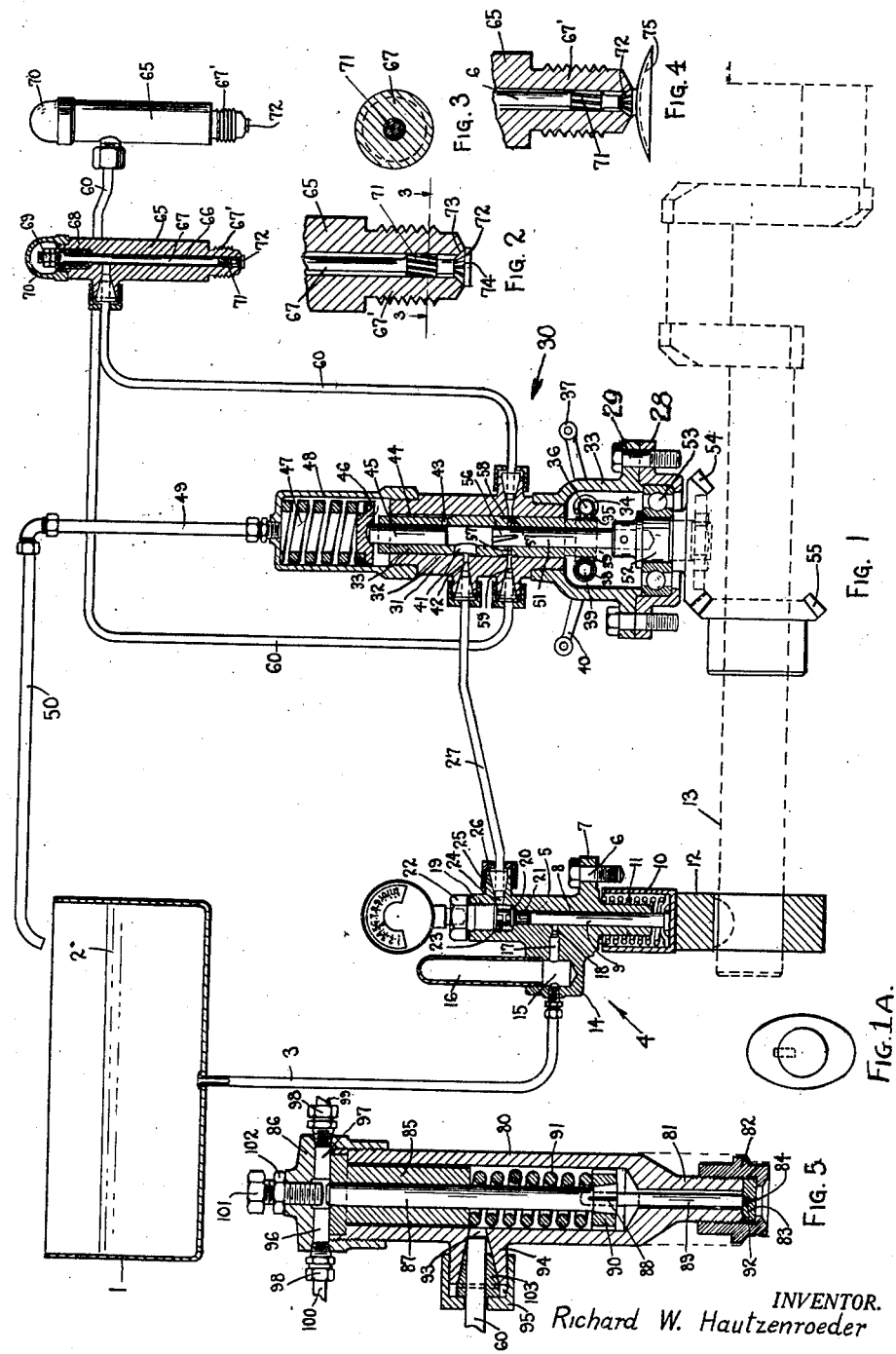

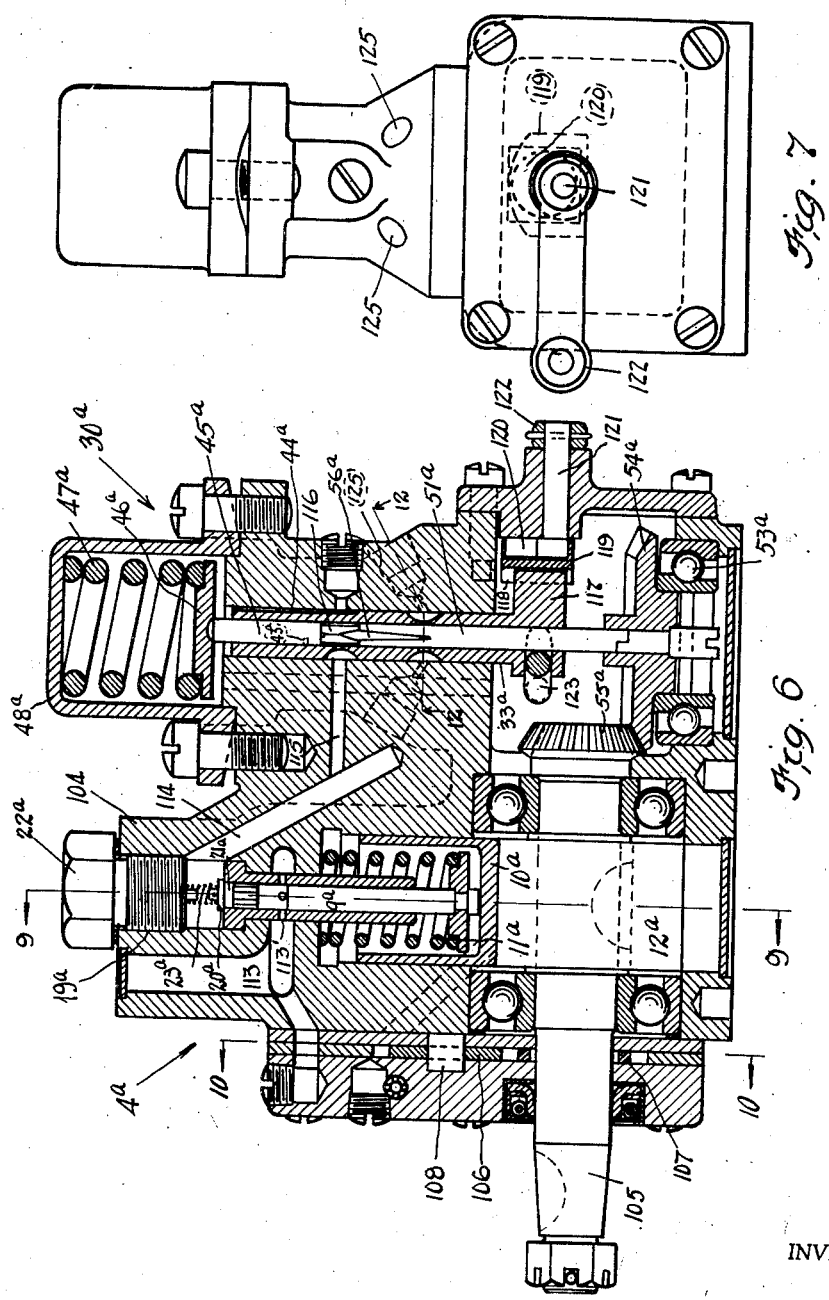

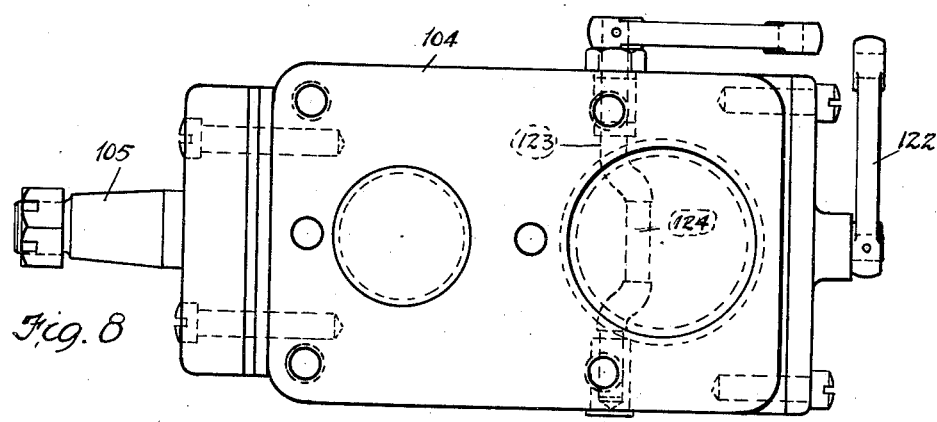
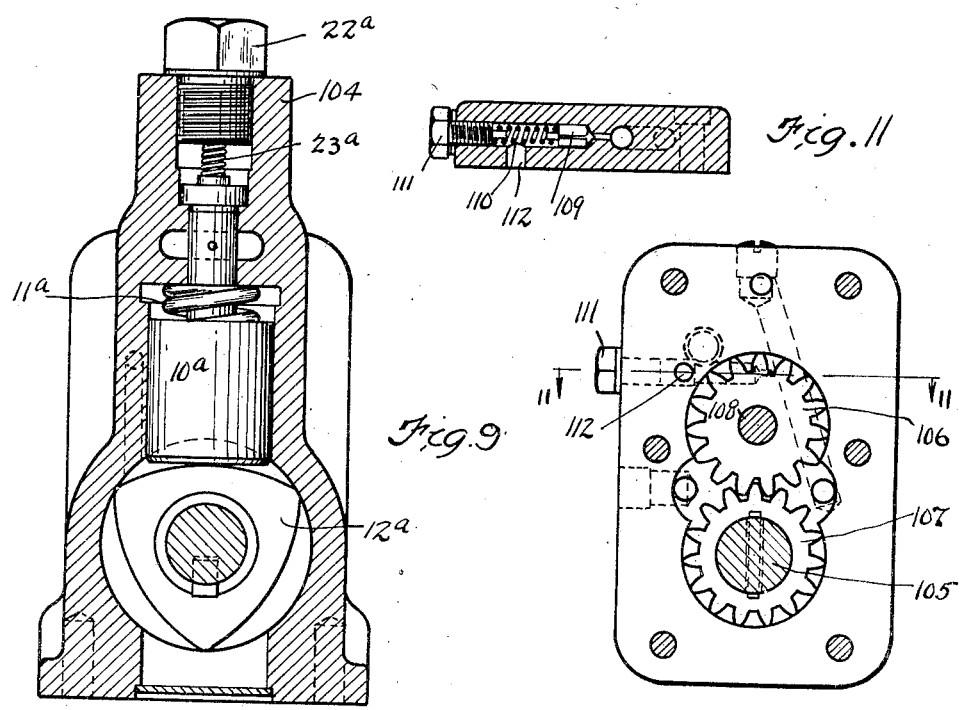
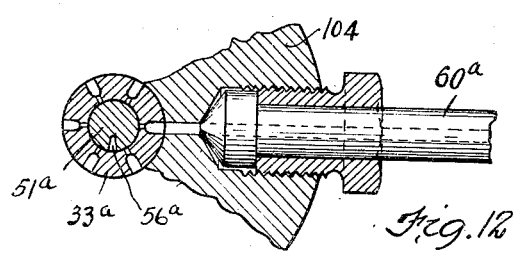

Dec. 7, 1937.      R. W. HAUTZENROEDER      2,101,064
FUEL SYSTEM FOR INTERNAL COMBUSTION ENGINES
Filed Sept. 26, 1933      4 Sheets-Sheet 4

INVENTOR.
Richard W. Hautzenroeder
BY
Fay, Oberlin & Fay
ATTORNEYS

Patented Dec. 7, 1937

2,101,064

UNITED STATES PATENT OFFICE 2,101,064

FUEL SYSTEM FOR INTERNAL COMBUSTION ENGINES

Richard W. Hautzenroeder, Mansfield, Ohio

Application September 26, 1933, Serial No. 691,040

24 Claims. (Cl. 123—139)

This application is a continuation in part of my copending application Ser. No. 457,174, filed May 29, 1930.

This invention, relating as indicated to fuel systems for internal combustion engines, has specific reference to improvements in a complete fuel system and component parts thereof applicable to be employed most advantageously in connection with engines operating on the compression ignition or Diesel cycle. Although it will be noted that the fuel system comprising my invention is likewise applicable to engines employing electrical or other suitable ignition means or on engines operating with compressions too low for self-ignition.

Before passing on to a detailed consideration of the apparatus and method comprising my invention, it is believed that a brief statement with regard to the mode of operation of engines of the character to which this invention applies given in the same terms as the description of my method and apparatus will be helpful to a full understanding of my invention.

There are at present three basic combustion cycles available in the operation of engines with compression ignition in an open combustion chamber and inasmuch as my invention relates to these cycles, a brief definition of each will be given so that there may be a fuller understanding of the application of the principle of my invention to this type of engine operation.

In the Otto or constant volume cycle combustion takes place at or before the piston reaches top dead center and continues for only a very brief period of time. This is the cycle under which conventional gasoline engines operate and is characterized by rapid combustion, high pressures with rapid rate of pressure rise, shock-loading and roughness in high output engines. Experience has shown that this cycle is most suitable for the extreme high rotative speeds at moderate mean effective pressures.

In the "Diesel", or constant pressure cycle, combustion is initiated at the end of the compression stroke and continues at such a controlled rate as to maintain a constant maximum pressure throughout a portion of the expansion stroke. This cycle is found only in low speed, true Diesel engines and is characterized by progressive combustion, definitely limited pressures without pressure rise during combustion, extreme smoothness and absence of shock. This cycle is excellent for operation at low speeds under high torque.

In the Sabathé or mixed cycle combustion is partially completed at constant volume followed by completion of combustion at approximately constant pressure. This cycle is found in many of the medium and high speed Diesel engines which carry high mean effective pressures and is characterized by rapid combustion and rapid pressure rise to a point considerably above the terminal compression pressure followed by progressive combustion at sustained high pressure thru a portion of the power stroke and gives the maximum power output from a limited displacement consistent with good fuel economy and moderate shock. This cycle is the most suitable for the speeds and loads normally encountered by the conventional heavy duty gasoline engine.

The ideal cycle for a Diesel engine operating under widely varying conditions would be a combination of all three cycles arranged as follows:

*First.*—Constant pressure combustion for low speeds and heavy loads corresponding to operation of a gasoline engine under full open throttle and retarded spark.

*Second.*—Sabathé, or mixed cycle combustion, at all "normal" speeds and loads corresponding to the control of a gasoline engine by throttle alone with the "spark" set at normal or "driving" range.

*Third.*—Constant volume combustion for extreme high speeds or "cruising" speed with light load corresponding to full or nearly full open throttle and maximum "spark" advance.

With the above three stage combustion cycle, a Diesel engine could operate under the extreme range of conditions now encountered by high speed heavy duty gasoline engines with equally satisfactory performance (even better performance under slow speed heavy load conditions) and greatly superior economy. Heretofore Diesel engines have almost without exception operated on one of the above three cycles throughout their entire range with obvious limitations.

In order to design a system that will meet the requirements of the ideal cycle outline above, the various phases of combustion and how they are influenced or controlled must first be considered.

Combustion itself has three phases or stages, viz:—

*First.*—The ignition lag period which is that period during which fuel is injected but has not yet ignited. Research has shown that ignition lag is influenced as follows:

1. The ignition lag period varies with the nature of the fuel used and generally speaking, fuels that knock badly in a gasoline engine burn best in a compression ignition engine. If the engine under consideration is to burn various and sundry grades of fuel, provision must be made to vary the start of injection relative to the engine cycle or, to use a gas engine term, the "spark timing" must be variable.

2. The ignition lag period varies with engine speed. Expressed in time units, the ignition lag usually decreases considerably with an increase in engine speed but expressed in degrees of crankshaft rotation, may remain fixed or even increase.

3. The ignition lag period varies with terminal compression temperature and therefore with the temperature of the aspirated air; the ignition lag decreasing with an increase in temperature. A cold day therefore requires a more advanced injection than a hot day.

4. The ignition lag period varies with the coarseness of the spray, decreasing almost directly with the size of the fuel particles.

5. The ignition lag period varies with the relative velocity of the spray and the air, decreasing as the relative velocity increases.

*Second.*—The ignition period during which the fuel, which has been injected during the lag period, ignites. Combustion during this phase is uncontrollable and can be limited in its effect only by reducing the ignition lag to a minimum.

*Third.*—The controlled combustion period during which the balance of the fuel is injected and combustion regulated by the rate of injection. If the start of injection is so timed as to initiate combustion at the proper moment, the various combustion cycles can be secured as follows:

1. Constant pressure combustion requires injection at an increasing rate in order to maintain the pressure constant as the combustion volume increases.

2. Sabathé, or mixed cycle, combustion requires injection at a substantially constant rate with ignition initiated ahead of top dead center to a degree depending on that portion of fuel which it is desired to burn at constant volume.

3. Constant volume combustion requires injection at a decreasing rate (started at a comparatively high rate) so as to introduce most of the fuel ahead of top dead center and a considerable portion of it during the ignition lag period.

The effect of different types of nozzles on injection and combustion will now be considered:

*First.*—The plain open nozzle (either single hole or pepper pot type but having a fixed orifice) is the most reliable mechanically as it has no moving parts but is unsatisfactory with "jerk pump" supply due to the low pressures at low pump speeds. The resulting coarse sprays at low speeds greatly increase the ignition lag and this is often utilized to obtain the necessary "retarded" timing effect with fixed pump timing but the resulting combustion is extremely "rough" with excessively high pressures. Likewise if the orifice is properly proportioned for normal speeds it is far too small for higher speeds and the resistance causes the fuel delivered from the pump to accumulate in the line and the actual period of injection (at the nozzle) may be several times the period of delivery (at the pump) thus causing a large portion of the combustion to occur too late in the expansion stroke.

*Second.*—The differential nozzle with single hole or pepper pot tip is open to the same objections as the plain nozzle at high speeds but does provide a fixed starting or opening pressure for the pump to work against thereby avoiding too coarse a spray at low speeds with attendant lag. However, it introduces the additional objections of "bounce", i. e., secondary discharges, and "skipping" when idling (which is that condition where the pump requires several strokes to build up the differential between opening and closing pressures).

*Third.*—The mechanically operated (common rail) nozzle with single hole or pepper pot tip is fairly satisfactory if fuel pressure and duration of valve opening are controlled concurrently but is generally too coarse at low speed and too fine at high speed due to the use of a fixed orifice. In addition the inertia effects prevent satisfactory operation at speeds comparable with gasoline engine speeds and the system may be drained of fuel if it stops on dead center. In some systems the valves are opened mechanically and allowed to close when the pressure in the line fails to a certain point, control being effected by introducing measured charges of fuel into the line previous to opening the valve. The objection to this sytem is that the period of injection is a fixed time quantity for a given fuel charge and consequently the combustion tends toward constant volume at low speeds and constant pressure at high speeds which is opposite of the ideal characteristics and impairs performance at either extreme.

*Fourth.*—The variable orifice nozzle responsive to pressure changes but with complete closure is the most satisfactory type of nozzle so far considered as it reduces the ignition lag and also the effects of "bounce" but generally lacks the penetration of the hole type nozzle and has been condemned on some engines because pumping errors were greatly "magnified" although this sensitivity should be an advantage.

The ideal characteristics for a nozzle are:

1. Mechanical reliability and freedom from clogging, which requires either a large hole or outwardly opening valve and the absence of sliding parts and tight fits.

2. Fine spray at all times to reduce ignition lag, which requires a variable orifice responsive to pressure (the most effective forms of spray for short ignition lag have been either multiple jets or a thin sheet).

3. High velocity of spray, which requires high pressures and a restricted orifice responsive to pressure changes.

4. Directional effect to suit combustion chamber.

5. No "bounce" or secondary discharge which requires that complete closure must be avoided by "bleeding" the valve or by similar means.

6. Practically instantaneous response to pressure fluctuations, which eliminates mechanical operation, moving parts of any perceptible mass, and mechanical friction.

7. Practically constant penetration regardless of pressure or amount injected in order to avoid "burned out" zones and in order to reach all the air in the combustion chambers.

The various types of pumps and their effect on injection and combustion will now be considered:

*First.*—The conventional "jerk" pump with variable stroke control (by means of suction valve, lift limit or spill valve) is by far the most common altho open to the following objections, viz: variable timing control is usually difficult and costly; obtaining perfect balance between different cylinders both as regards amount and time of injection is difficult; reactions on controls are usually severe especially if compared with the small effort required for the conventional spark and throttle control on a gasoline engine; pressures are too low at low speeds if open or "bled" nozzles are used; tends to "skip" if differential or total closure valves are used.

*Second.*—Plain pump (common rail) for use with mechanically operated valves is very reliable, simple and economical to build but has no effect on combustion. However, an accumulator and pressure regulator are usually required and the latter unit has been a source of trouble in the past.

*Third.*—Spring loaded plunger type pump has good characteristics for fixed load and speed conditions with constant volume combustion but the rate and period of injection are fixed for a given amount of fuel.

*Fourth.*—A metering pump with a separate injecting pump is mechanically complicated and costly to build; inertia effects are sometimes troublesome at high speeds, and the combustion cycle is generally fixed.

*Fifth.*—Timed "jerk" pump with a distributor is more compact and less expensive to construct than a multiple jerk pump and eliminates the difficulty of balancing separate pumps but is otherwise open to the same objections as the common "jerk" pump as outlined above.

The ideal characteristics of a pumping unit for use with the aforementioned ideal spray valve are:

1. The timing must be variable with ease to accommodate variations in ignition lag due to fuel, temperature, speed, etc.

2. Period of injection must be definitely limited to a maximum at full throttle and reduced at part throttle.

3. Perfect balance must exist between all cylinders without adjustment, which indicates the necessity of some common control and a distributor.

4. Simplicity, reliability and low cost of construction indicate the necessity of one plain pump in connection with a simple distributor.

5. A variable characteristic of delivery to suit desired combustion cycle, obtainable as follows:

(a) For constant pressure combustion at "retard" an accelerated rate of delivery (rising pressure) which indicates dependence on a pump with the proper cam contour.

(b) For constant volume combustion at "full advance", a decelerated rate of delivery (falling pressure) which indicates the necessity of a heavily loaded spring actuated plunger.

(c) For Sabathé, or mixed cycle, combustion at "normal driving range", a constant rate of injection which indicates a pump in connection with a pressure regulator or a cross blend of rising pressure from a pump and falling pressure from a spring loaded plunger giving an approximately constant pressure.

6. Power control by variations of average pressure and duration of injection period without effecting the characteristic of delivery or the instant of starting injection and without hydraulic reaction on the controls.

7. "Fool-proof" construction with no adjustments other than the "spark" and "throttle".

The fuel system comprising my invention by which the previously enumerated desirable results may be secured consists generally in the provision of a tank or other suitable container for liquid or gaseous fuels, a pump responsive to engine speed, and capable of building up sufficient pressure for the proper operation of the fuel supply system and the delivery at all speeds of a quantity of fuel in excess of the engine's maximum requirements, an adjustable pressure regulator adaptable to suit the conditions under which such engine operates, a fuel flow interrupter and fuel distributor which breaks and controls the fuel flow to the proper cylinder at the proper instant and for the correct period of time, a spray valve which introduces the fuel to the combustion chamber of the engine in the correct form for the most efficient operation of such engine, and suitable high pressure conduits connecting the above named devices into a complete system.

It is a further object of my invention to provide a method of injecting the fuel charges into the combustion chamber of a Diesel engine, whereby such engine may be made to operate in the most desirable fashion, as above pointed out, for the particular use to which such engine is put.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a view showing the general arrangement and relation of the several elements included in the complete fuel system comprising my invention, such elements being shown in section to more clearly illustrate their construction; Fig. 1a is an end elevational view drawn to reduced scale of the shaft 13 and the cam 12 mounted thereon; Fig. 2 is a fragmentary enlarged sectional view of the spray valve illustrated in Fig. 1; Fig. 3 is a transverse sectional view of the spray valve illustrated in Fig. 2, taken on the plane substantially indicated by the line 3—3; Fig. 4 is a fragmentary transverse sectional view of a spray valve similar to that illustrated in Fig. 2, but showing as a modification the addition of a fuel deflector; Fig. 5 is a sectional view of an alternative form of spray valve construction; Fig. 6 is a sectional view of a modified form of a portion of the apparatus comprising my invention in which modified construction, the pump distributor and associated parts are combined into a unitary structure; Fig. 7 is a righthand end elevational view of the apparatus illustrated in Fig. 6; Fig. 8 is a bottom view of the apparatus illustrated in Fig. 6; Fig. 9 is a transverse sectional view of the apparatus illustrated in Fig. 6 taken on a plane substantially indicated by the line 9—9; Fig. 10 is a transverse sectional view of a portion of the apparatus illustrated in Fig. 6 taken on a plane substantially indicated by the line 10—10; Fig. 11 is a fragmentary sectional view of the apparatus as most clearly illustrated in Fig. 10 taken on a plane substantially indicated by the line 11—11; Fig. 12 is a fragmentary sectional view drawn to an enlarged scale of a portion of the apparatus illustrated in Fig. 6 taken on a plane substantially indicated by the line 12—12; and Figs. 13 to 17 are schematic diagrams showing the character of the injection for various conditions of operation of an engine including a fuel injection system and operating according to the method of my invention.

Referring more specifically to the drawings and more especially to Fig. 1, the component parts of the complete fuel system comprising my invention will be described in the order through which the fuel passes on its way from the supply means to the cylinder of the engine where it is ultimately consumed. The fuel reservoir here shown for purposes of illustration comprises a tank 1 which may be of any form so as to properly contain the fuel 2 therein, which fuel may be either liquid or gaseous. The fuel supply tank 1 has associated therewith a conduit 3 which carries such fuel from such tank to the pump now to be described.

The fuel pump, indicated generally by the numeral 4, consists of a body member 5 which may be suitably rigidly secured to a rigid base (not shown) by means of a screw 6 which passes through an aperture formed therefor in a lug 7 preferably formed integrally with the body member 5. The body member 5 has a bore 8 extending axially and longitudinally therethrough, which bore slidably engages a plunger 9. The plunger 9 has a cup-like member 10 associated with the lower terminal thereof in which, coaxially with the plunger 9, is mounted a compression spring 11 which maintains the cup-like member 10 in contact with a cam 12 which is secured to a shaft 13 preferably driven synchronously with the crank shaft of the engine to which the fuel system is applied. The body member 5 has a projection 14 formed integrally therewith and extending laterally therefrom, which projection has formed therein a well 15 which is in communication with the fuel conduit 3. The well 15 has its main opening closed by a dome-like member 16 which provides a surge chamber for the fuel during the operation of the pump. The well 15 has a conduit 17 associated therewith, which conduit terminates in an aperture 18 in the wall of the bore 8. This aperture is preferably just above the upper end of the plunger 9 when such plunger has moved to its lowermost position.

The bore 8 in the body member 5 is enlarged in the upper portion of such body as at 19, the shoulder formed by such enlargement being formed into a valve seat 20 for a valve member 21 which seats thereon. Threadably engaged by the enlarged bore 19 is a retaining nut 22 which has a spring 23 associated therewith adapted to resiliently maintain the valve 21 on its seat 20. Excessive movement of the valve 21 is prevented by oppositely disposed projections formed on the faces of the valve 21 and the lower end of the nut 22. The enlarged bore 19 has an aperture 24 formed therein which extends through a boss 25 formed on the side of the body member 5, which boss is engaged by a nut 26 which serves as a securing means for a fuel conduit 27.

The fuel pressure regulator flow-interruptor and fuel distributor indicated generally by the numeral 30, consists of a body member 31 which has a cylindrical bore 32 extending axially and longitudinally therethrough. Threadedly secured to the lower terminal of the body member 31 is a housing and securing base consisting of complementary elements 33 and 28 which are suitably maintained in assembled relation by bolts 29 which likewise may be utilized to secure this element to a rigid base. Closely fitted in the bore 32 in the body member 31, but movable with respect thereto, is a sleeve 33 which is axially adjustable by means of a pinion 34 which engages a suitable rack 35 formed on the lower terminal of such sleeve. The pinion 34 is secured to a shaft 36 which has secured thereto an adjusting lever 37. Rotation of the sleeve 33 may be effected by a worm pinion 38 which is in mesh with a worm rack 38' secured to the lower terminal of the sleeve 33. The worm 38 is secured to a shaft 39 which has secured thereto an adjusting lever 40.

The sleeve 33 has an aperture 41 of relatively large proportions formed in the wall thereof, which aperture registers with an aperture 42 formed in the wall of the body member 31 and which is in communication with the fuel conduit 27. The aperture 41 as indicated, is of sufficient size so that upon axial or circumferential movement of the sleeve 33, the passage of fuel from the conduit 27 to the interior of the sleeve 33 is not interfered with.

The sleeve 33 has an aperture 43 formed in the wall thereof, which aperture is in communication with a groove 44 formed on the outer periphery of the sleeve 33 so that fluid passing through out of the sleeve 33, through the aperture 43, may pass upwardly through such groove for the purpose hereinunder more fully explained.

The sleeve 33 has movably mounted therein a plunger 45 which forms a substantially fluid-tight fit with the inner wall of the sleeve 33 and which extends upwardly out of such sleeve and is engaged by a cap 46. The cap 46 has mounted thereon a compression spring 47 which is axially restrained by a cup-like member 48 which is secured to the upper terminal of the body member 31. The cup-like member 48 has an overflow fluid conduit 49 associated therewith which, along with the conduit 50 provides a fluid overflow return to the tank 1.

Projecting up into the sleeve 33 and forming a fluid-tight fit therewith, is a rotatable shaft 51 which, at its lower terminal, is secured in a hub 52 journaled in a bearing 53 and which carries a gear 54 in mesh with a driving gear 55 secured to a shaft driven synchronously with the crank shaft of the engine. The shaft 51 has formed in the outer periphery thereof, in its outer terminal, a groove 56 which may be curved and which preferably tapers as indicated toward the end of the shaft. The sleeve 33 has a plurality of circumferentially spaced apertures 57 formed in the wall thereof, which apertures lead into depressions 58 formed in the outer periphery of the sleeve 33. These depressions permit the fuel to flow from the aperture 57 to conduits 59 formed in the wall of the body member 31 when the sleeve 33 is adjusted either axially or circumferentially in the manner hereinbefore described by the adjusting arms 37 and 40. The apertures 57, which are preferably equally spaced in the periphery of the body member 31 and which correspond in number to the number of cylinders of the engine to which the fuel system is applied, have associated therewith fuel conduits 60 which lead to the spray valves associated with the respective cylinders.

It will be noted that, upon rotation of the shaft 51, when the grooves 56 are brought into alignment with the apertures 57 formed in the wall of the sleeve 33, the fuel from the interior of such sleeve is permitted to flow therefrom through the several aligned apertures to the conduit 60 which carries such fuel to the proper spray valve.

The spray valve, shown in association with the mechanism illustrated in Fig. 1, which valve is shown in detail in Figs. 2, 3 and 4, consists of a cylindrical body member 65 which has a cylindrical bore 66 extending axially therethrough. The cylindrical body member 65 has a reduced threaded terminal portion 67' by means of which the valve may be secured in a threaded aperture formed therefor in the wall of the cylinder of the engine to which the fuel system is applied. Coaxially mounted in the bore 66 is a valve stem 67 which has coaxially associated therewith, a compression spring 68 mounted in an enlargement of the bore 66 and is axially secured to the valve stem 67 by means of lock nuts 69. The upper terminal of the body member 65 is sealed by a cap 70 which is removably secured thereto after the assembly of the above named valve stem, spring and lock nuts. The lower terminal of the valve stem 67 has an enlarged longitudinally serrated portion 71 formed integrally therewith, which maintains the valve stem centrally in the bore 66 and permits the fuel to pass downwardly through such bore in the annular space surrounding the valve stem.

Preferably formed integrally with the lower terminal of the valve stem 67 is a substantially conical enlargement 72 which engages a complementary valve seat 73 formed in the lower terminal of the bore 66. The conical element 72 is provided with a plurality of grooves 74 which, when such conical element is in engagement with its seat 73, permits a relatively small quantity of fluid to pass from the annular space around the valve stem to the interior of the cylinder of the engine when suitable pressure is exerted on said fluid on the interior of the spray valve. The conical element 72 may have a convex deflector 75 secured to the base thereof, as most clearly illustrated in Fig. 4, which deflector insures a proper dissemination of the fluid in the cylinder to which the spray valve is connected.

An alternative form of construction for a spray valve is shown in Fig. 5 which consists of a hollow body member 80 which has a reduced lower portion 81 threadably engaged by a sleeve 82 which is adapted to be engaged by an aperture formed therefor in the cylinder head of the engine to which the fuel system is applied and which serves as a means for securing an annular valve member 83 which has an aperture 84 provided centrally therein for the purpose of admitting the fuel to the cylinder. Rigidly secured in the upper terminal of the body 80 is a sleeve 85 which is so secured by means of a cap 86. Slidably mounted in the sleeve 85 is a plunger rod 87 which is of such diameter so as to provide a substantially fluid-tight fit in the sleeve 85. The plunger rod 87 is terminally slotted as at 88 and provided with an axially extending aperture in this terminal, which aperture is adapted to receive a pin 89. After the pin 89 has been inserted in the aperture formed therefor in the lower terminal of the plunger 87, a collar 90 having peripheral longitudinally extending serrations is forced onto the lower terminal of the rod 87. This collar 90 and terminal have complementary conical surfaces as illustrated in this figure which surfaces coact to compress the slotted terminal of the rod 87 to insure a rigid connection between such rod and the pin 89. The collar 90 serves as a means for axially restraining a compression spring 91 which urges the conical terminal 92 of the pin 89 into engagement with a similarly formed aperture in the annular member 83. The interior of the body member 80 has an inlet port 93 associated therewith extending through a boss 94 formed therefor, which boss is adapted to threadably engage a nut 95 by means of which a fuel conduit such as 60 is properly secured to the body 80. The cap 86 has ports 96 and 97 formed therein adapted to receive couplings 98 for tubes such as 99 and 100. The tubes 99 and 100 serve as means for carrying off fuel which has leaked past the plunger rod 87 into the cap 86. The cap 86 is also provided with an adjusting screw 101 and lock nut 102, which adjusting screw extends into adjustable proximity with the terminal of the plunger rod 87 so that the movement of such plunger rod may be adjustably limited in the manner hereinafter more fully explained.

In the enlarged view, as shown in Fig. 5, I have illustrated the preferred embodiment of the construction whereby the high pressure fuel conduits are secured to the several members of my fuel system. The tube such as 60 has coaxially mounted therewith a compression plug 103 which is in the form of a truncated cone of malleable material. The tube 60 has the cap nut 75 mounted coaxially therewith, which cap nut has an aperture formed centrally in the head thereof of such a diameter as to permit such cap nut on the tube 60. The boss 94 has the aperture therethrough conical in form, the included angle of the sides being measurably greater than the included angle of the compression plug 103, so that when the cap nut 75 is drawn tight, the small end of the compression plug 75 is forced tightly against the outside surface of the tube and also wedged tightly into the tapered seat. A further tightening of the cap nut, not only increases such gripping action, but also wedges the protruding end of the tube 60 into the tapered seat, thus effecting an additional seal.

In Figs. 6 to 12 is illustrated a modified form of construction of the previously described apparatus, particularly the pump and distributor portions thereof and this modified construction is characterized by the inclusion in a single unitary structure of the pump and distributor.

While the fundamental principles of construction of the previously described pump and distributor elements are retained in this modified form, nevertheless, there are sufficient structural differences present in the modified form so that such construction will now be briefly described and in such description reference characters similar to those originally employed will be used to designate similar parts.

As previously indicated, the pump and distributor units previously generally indicated at 4 and 30 and in this construction, indicated at 4a and 30a, are included in a single housing member, generally indicated at 104. The advantages of consolidating these elements as shown in Figs. 6 to 12 reside in a simplicity of construction, low cost of manufacture and improved performance, which latter factor may be, in a measure, attributed to a decrease in length of the conduit required to carry the liquid fuel under pressure from the pump to and through the distributor.

In the construction illustrated in Fig. 1, the pump driving cam 12 and the distributor driving gear 25 were shown separately secured to an extension 13 of the crank shaft of the engine with which the fuel supply system is associated. In the construction illustrated in Fig. 6, there is provided a shaft 105 the terminal of which may have a suitable gear keyed thereto and which gear is driven directly from the crank or cam shaft of the engine, the essential feature here being that the pump and distributor be driven synchronously with the rotation of the crankshaft and the reciprocation of the pistons in the cylinders.

In the construction illustrated in Fig. 6, the liquid fuel is supplied to the pump 4a by means of a booster pump of the gear type which consists of gears 106 and 107, the latter being preferably mounted directly on the shaft 105 and the former being mounted on the stub shaft 108 mounted in a portion of the main casing 104 of the apparatus. The gear pump just referred to has an unloading valve generally illustrated in Fig. 11 associated therewith so that the supply of fuel from the gear pump to the principal pump may, for obvious advantages, be slightly in excess of the requirements of the principal pump. The unloading valve consists generally of a seating member 109, a spring 110 supporting the same and a securing screw 111. The overflow orifice 112 from the unloading valve may be provided with a suitable conduit which carries the fuel back into the fuel supply tank from which the pump draws the fuel.

The liquid fuel supplied by the gear pump just described under pressure is conducted to the principal pump, generally indicated at 4a, through a conduit 113. The construction and operation of the pump 4a is substantially identical with that of the previously described pump illustrated in Fig. 1, so that like reference characters having the subscript "a" will be here employed to designate similar parts.

Attention is directed to the cam member 12a shown in end elevation in Fig. 9, which in the illustrated construction, includes three lobes; the number of such lobes depending, of course, upon the number of cylinders which are to be served.

The fuel discharge under pressure from the pump 4a is delivered through the conduits 114 and 115 to the distributor similarly in the manner in which the conduit 27 in the construction illustrated in Fig. 1 carried the fuel from the pump to the injector.

The injector, generally indicated at 30a, in Fig. 6, is substantially identical with the injector illustrated in Fig. 1, with the exception of certain changes and structural details which will now be enumerated.

The spindle 51a is, at its upper end, provided with a reduced extension 116 which supports the plunger 45a when the same is not moved upwardly against the action of the spring 47a by means of fluid under pressure.

The means for elevating and rotating the sleeve 33a in the modified construction is slightly different from the means for accomplishing the same purpose as disclosed in Fig. 1.

In the modified construction, the sleeve 33a is provided with an extension 117 at one side, which extension has an axially extending slot into which extends a rib 118 of the cam block 119. The cam block 119 has a recess on its righthand face, as viewed in Fig. 6, into which extends a cam 120 carried on the end of a shaft 121. As the shaft 121 is rotated by means of the handle 122, the block 119 is caused to move laterally in a select direction to rotate the sleeve 33 for regulation of the time of injection with respect to the position of the pistons within the cylinders.

The sleeve 33a is moved vertically relatively to the spindle 51a by means of a yoke or yoke shaft 123, which intermediately of its ends, i. e., at 124, engages a slot in the lower side of the sleeve. Rotation of the shaft 123 will, therefore, cause a displacement of its central portion and accordingly an axial movement of the sleeve 33a, with respect to the spindle 51a.

The portion of the housing 104 surrounding the spindle 51a and sleeve 33a is of the form of a pillar provided with a plurality of openings 125 which lead into the space about the sleeve 33a to lead the fuel charges delivered by the distributor through suitable conduits to the particular injectors to which such conduits are connected.

The cross-sectional form of the spindle 51a, the sleeve 33a, and the manner in which the conduits 60a may be secured to carry the fuel charges from the distributor to the injector are most clearly illustrated in Fig. 12.

The operation of my complete fuel system may be briefly described as follows. Upon rotation of the cam member 12, or like means, a reciprocating movement is imparted to the plunger 9 of the fuel pump 4 and as the spring 11 moves such plunger downwardly from the position shown in Fig. 1, the valve 21 will seal the upper end of the bore 8, so that a vacuum is produced between the upper end of the plunger 9 and such valve. After the plunger 9 has moved downwardly for a distance sufficient to uncover the port 8, such vacuum will cause the atmospheric pressure acting on the fuel in the tank 1 to force such fuel into the space in the bore 8 between the upper terminal of the plunger 9 and the valve 21. In order that the pump may be efficiently operated during the rushes of fuel through the conduit 3 to the pump 4, the storage chamber 16 is provided, which insures such pump to operate at full capacity. When the plunger 9 is moved upwardly at the beginning of the next stroke, the port 18 is sealed by such plunger and the fuel which is therefore entrapped in the bore 8 is forced upwardly, unseating the valve 21 and passing out through the conduit 27. The nut 22 may have an axial bore extending therethrough, which bore has in communication therewith a suitable gauge for the purpose of indicating the pressure built up by the pump.

The operation of the pump 4a illustrated in Fig. 6 is slightly different from the operation, as just described, of the pump disclosed in Fig. 1. In the construction illustrated in Fig. 6, the booster gear pump supplies the fuel under pressure to the main pump 4a instead of the partial vacuum and gravity feed to the pump as described in connection with Fig. 1. In all other principal aspects the two constructions are identical and operate in the same fashion.

The operation of the pressure regulator and fuel flow interrupter and distributor may briefly be described as follows:

The fuel under pressure leaves the conduit 27 and enters the interior of the sleeve 33 through the aperture 41 provided in the wall thereof, and such fuel pressure will then cause the plunger 45 to be moved upwardly against the action of the spring 47 until the lower terminal of such plunger uncovers the ports 43 for a sufficient amount so that equilibrium is established whereby the proper operating pressure is maintained on the interior of the sleeve 33. The shaft 51 which rotates synchronously with the crankshaft of the engine, carries the groove 56 successively into communication with the apertures 57 so as to permit a measured quantity of fuel to pass from the interior of the sleeve 33 to the conduit 60 which conducts such fuel to the spray valves. By axially moving the sleeve 33, the relative position of the relief aperture 43 may be adjusted with respect to the body 31 so that the fuel pressure required to move the plunger 45 so as to permit the escape of a portion of such fuel is varied, thereby regulating the working pressure of the fuel on the interior of the sleeve 33. This axial movement of the sleeve 33 may be effected by manual or automatic control of the adjusting lever 37. By rotating the sleeve 33 about its vertical axis, the instant at which communication is established between the fuel on the interior of the sleeve 33 and the conduit 60 may be regulated so as to effect what is commonly termed a retarded or advanced injection. This rotation of the sleeve 33 to effect such retarded or advanced injection is effected by the control lever 40 which may be actuated either manually or by suitable form of governor operated from the engine.

For high speeds or heavy load engine operation, it is essential that the fuel on the interior of the sleeve not only be fed to the conduit 60 under greater pressure than at low speeds or light loads, but also such fuel should have a relatively longer period of flow, this being effected by having the groove 56 tapered outwardly toward the end of the shaft 51. Therefore, as the sleeve 33 is moved upwardly so as to increase the operating pressure of the distributor, the ports 57 will be engaged by a relatively wider portion of the groove 56, so that, upon rotation of the shaft 51, the fuel on the interior of the sleeve 33 will have a longer period in which to flow to the feed conduit 60 than when the sleeve 33 is in a lower position. The above adjustments, it will be noted, are effective to produce the proper operating conditions irrespective of the pressure built up by the pump 4 since the excess pressure or surplus of fuel supply is relieved and discharged through the conduit 50 back to the supply tank. The entire range of adjustments, necessary and expedient to the proper operation of the fuel supply system for all conditions of operation to the engines to which such system is applied, is effected by the single sleeve 33, which adjustments can be made independently of any excess pressures or excess fuel delivered or supplied by the pump 4. The operation of the distributor illustrated in Fig. 6 is substantially identical with that just explained in connection with Fig. 1 and the manner in which this distributor may be utilized to effect an injection of a fuel charge according to the method comprising my invention will presently be explained in greater detail.

The operation of the spray valve, as illustrated in Figs. 1 to 4, inclusive, as above indicated, produces different conditions of injection of the fuel depending upon the pressure of the fuel as supplied thereto by the conduit 60. When the engine is operating at low speeds or light loads, the pressure in the conduit 60 will be relatively small due to adjustments made in the distributor 30 in the manner hereinbefore described, which low pressures will be relieved by small jets of fuel passing through the grooves 74, which jets will be projected into the cylinder chamber in the manner best suited to the operation of the engine at such low speeds or light loads. As the load or speed of the engine is increased by increasing the pressure of the fluid in the supply conduit 60, such additional pressure will cause the valve stem 67 to be moved axially against the pressure of the spring 68 thereby unseating the member 72 from its complementary seat 73. The fuel flow which at low speeds consisted of a plurality of small jets, is now increased into a hollow cone varying in density in proportion to the pressure in the conduit 60. A proper dissemination of the fuel may be effected by having the deflector 75 secured to the conical member 72, such deflector breaking up the hollow conical stream in a suitable manner, increasing the efficiency of the engine. If the form of spray valve illustrated in Fig. 5 is employed, the fuel flow to the cylinder of the engine at low speeds will occur through the grooves formed in the conical terminal 92 of the stem 89, and as the pressure in the conduit 60 is increased, the plunger 87 will be moved upwardly against the pressure of the spring 91, unseating the valve 92, thereby permitting a greater amount of fuel to be injected into the cylinder. Any seepage of fuel, which occurs upwardly along and past the plunger 87 is returned to the fuel tank by means of a conduit 99 or 100. One of such conduits may be connected to the spray valve in communication with another cylinder, so that only one main return line need be provided for the leakage in the several valves.

It will be noted that the overcapacity of the pump as heretofore specified will, at all times, maintain in the storage chamber of the distributor a supply of oil under the compression of the spring 47. The degree of compression will be determined by the position of the adjustable sleeve 33. It will also be noted that the compression strokes of the pump will be synchronized with the functioning of said sleeve 33, so as to occur during the periods the tapered groove 56 is in communication with a port or aperture 57. Thereby an impulse of the pump effects a fuel discharge in the cylinder co-incident with the fuel discharge which is flowing by virtue of the compression spring 47.

The method for injecting the fuel charges into the combustion chamber according to the principles of my invention may best be understood by having reference to Figs. 13 to 17. Fig. 13 represents one complete revolution of the crank shaft 13 or one complete revolution of the cam and pinion shaft 105. As this only represents one-half of a revolution of the distributor spindle 51a, the top dead center of cylinders 1 and 4, 3 and 6 and 2 and 5 in a six cylinder motor are shown together as they occur 360° apart and the selecting is done by the distributor shaft or spindle 51a in connection with the sleeve 33a.

The line in Fig. 13 represents the position of the high pressure pump plunger 9 or 9a relative to its stroke. At A, the plunger is at the top or outermost point of its stroke. From A to B, the discharge valve 20 or 20a is closed and the inlet ports 18 or 113' in the pump are sealed by the plunger; therefore, a vacuum or suction is created within the pump chamber. At point B, the plunger uncovers the suction ports and continues to the bottom of its stroke at C. Due to the differences in pressure, the fuel rushes in through the suction ports and fills the pump chamber. At C, the plunger starts up on its delivery stroke but does not cover the suction ports until it reaches D, which corresponds to B. From D on to A again is the actual driver stroke of the pump. This cycle is repeated and a fixed volume of fuel is delivered at each stroke of the pump for each power stroke of the engine.

Figure 14:
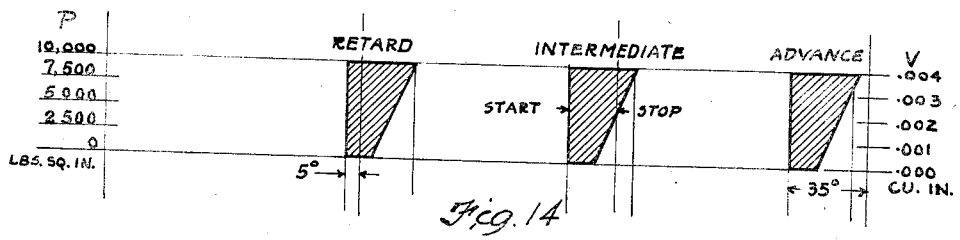

Fig. 14 represents the effect of moving the distributor sleeve 33 or 33a on the instant of commencing injection (delivery from distributor to spray nozzle and then to combustion chamber), as well as permissible duration of injection. It also shows how the volume of fuel trapped within the distributor and the pressure to which it is subjected is increased by raising the distributor sleeve.

By suitably forming the timing slots in the sleeve and the groove in the spindle, it is possible to secure a wide range in the permissible duration of injection, either increasing, decreasing, or remaining constant as the sleeve is moved axially. In this particular instance, the timing slots are so proportioned that with the sleeve in the lowermost position (corresponding to low pressures and smaller volumes of fuel) the permissible duration is approximately 10° of crankshaft travel. This increases at a constant rate as the sleeve is raised until a maximum period of injection of approximately 30° of crankshaft travel is obtained coincident with the maximum volume and pressure.

Independently of the above action, the instant at which injection commences can be shifted from 5° of crankshaft travel before top dead center of the pistons to approximately 35° of crankshaft travel before top dead center of the pistons, although it is to be understood that the range of adjustment is not limited to these values. For further consideration of the action of the distributor, three phases of timing, i. e., full retard, intermediate, and full advance, will be considered.

Figure 15:
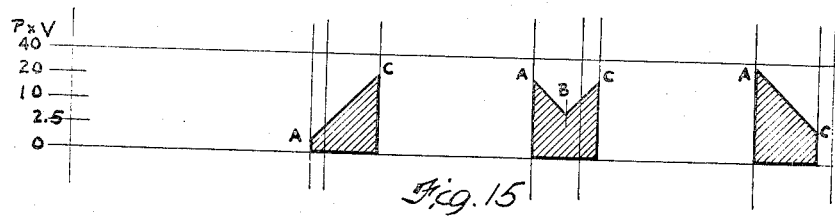

Fig. 15 shows the effect of injection characteristics of shifting the time of injection relative to the pump action, which, in this case, is fixed relative to the engine action by virtue of the positive connection between the cam which drives the pump and the crankshaft of the engine which determines the position of the pistons.

At full retard, injection commences approximately at the same instant that delivery from the pump commences and since the pump delivers fuel faster than the spray nozzle disperses it, the excess accumulates within the distributor raising the by-pass plunger 45 or 45a and compresses the by-pass plunger spring 47 or 47a, thereby subjecting the fuel to an increasing pressure until the injection is stopped at C. The result of this action on the engine is that injection and consequent combustion within the cylinder increases rapidly while the piston is starting on the expansion or power stroke, tending to hold the combustion pressures up to a high level for a definite period as shown approximately in indicator diagram in Fig. 16. This resulting action is especially desirable for carrying extreme overloads during acceleration or emergencies, although this action is not economical from the standpoint of fuel consumption.

At full advance, the range of injection is entirely outside of the range of pump delivery. The distributor, i. e., the space below the plungers 45 and 45a has been charged from the previous pump stroke and with the distributor sleeve raised, a maximum volume of fuel is trapped under the by-pass plunger and at maximum pressure. As soon as the injection is started at A the rate of injection is at its maximum due to the fact that the spring 47 or 47a has been deflected to the greatest extent. This maximum pressure, however, drops off as rapidly as removal of fuel from the distributor permits the by-pass plunger spring 47 or 47a to extend and dissipate its load. This action continues until cut off by the distributor at C. The resulting effect on combustion is an extremely rapid pressure rise and completion of combustion in a short period, all of which occurs before the engine piston reaches top dead center. These high pressures and rapid combustion are especially suitable for normal loads at the highest speeds and are attended by maximum economy of fuel consumption.

At the intermediate position the action is a combination of the previously explained retard and advance actions and results in a third characteristic of operation. The injection commences with a high pressure supplied by the spring 47 or 47a acting on the fluid trapped below the plunger 45 or 45a, which pressure drops as in the case of the full advance position until approximately halfway through the injection period, when delivery from the pump commences and the balance of the injection period is completed with a rising pressure and increasing rate of injection due to the fact that the pump supplies more fuel to the distributor than is required by the injectors and hence, the spring 47 or 47a is again deflected upwardly to progressively increase the pressure to which the fuel in the distributor is subjected. This action gives a rapid pressure rise and rapid combustion as with full advance but combustion is carried farther and the pressure maintained partially as with retarded injection and is most suitable for carrying the maximum economical load at normal working speeds.

Figure 17:
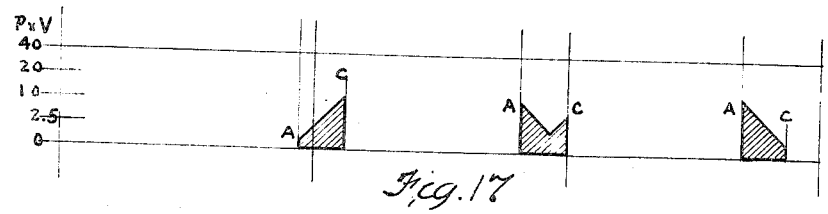

Fig. 17 shows how lowering the distributor sleeve 33 or 33a reduces the pressure (rate of injection) together with a reduction in the permissible period of injection, thereby reducing the fuel charge in proportion with reduced loads but without changing the characteristics of injection.

The above defined "retard", "intermediate" and "advance" operating conditions are respectively adapted for low speed, high torque operation, normal or intermediate speed and torque operating conditions and high speed, low torque operation.

*Low speed high torque operation*

For low speed high torque operation, so that the engine will run smoothly and there will be an absence of knocking due to extreme pressures, or rapid pressure rise, the indicator card diagram of a Diesel engine should approach as closely as possible the indicator card diagram of a steam engine. This type of operation is made possible in my apparatus by moving the sleeve rotating lever to the retard position, i. e., to such a position that the period of injection is initiated substantially simultaneously with the beginning of the delivery stroke of the pump, which is slightly in advance of the top dead center position of the piston in the cylinder.

When injection is so initiated, the fuel supplied by the pump being in excess of that required by the spray nozzle will be divided so that part of the impulse from the pump passes directly through the spray nozzle and the remainder is employed to displace the plunger in the reservoir against the action of the spring. As the period of injection progresses, therefore, the pressure increases as most clearly illustrated by the line AC in the left hand illustration of Fig. 15. The increase in pressure reflected in a progressive increase in the amount of fuel injected for each successive increment of time compensates for the increased volume in the combustion chamber occasioned by a recession of the piston in the cylinder, so that the pressure in the combustion chamber is maintained substantially constant to give the above referred to desirable indicator card diagram.

Normal or intermediate speed and torque operation

In order to secure smoothness of operation, freedom from knocking and high torque at normal or intermediate speeds, it is desirable that the indicator card diagram of a Diesel engine approximate the indicator card diagram of a steam engine, i. e., the pressure in the combustion chamber should be maintained constant at a maximum value for a period of approximately 20° of crankshaft rotation, whereupon, the pressure will be permitted to drop off similarly as the pressure in a steam cylinder drops off after the inlet valve is closed. In other words, the fuel charge into the combustion chamber should be regulated so that the combustion thereof will maintain maximum pressure even though recession of the piston increases the volume occupied by the gas. This period, i. e., approximately 20° of crankshaft rotation, corresponds to the period in steam engine operation during which the intake valve is open and the pressure in the steam cylinder is equal to boiler pressure minus the drop in the line.

I secure this combustion characteristic by introducing the fuel under the influence of two pressure impulses which are relatively adjustable as to amount and phase relation. The first pressure impulse in my device is secured from the spring acting on the plunger which backs up the reservoir in the distributor, such impulse being initiated by the establishment of communication between such reservoir and the injector by a rotation of the grooved spindle synchronously with the rotation of the crankshaft. The second impulse of pressure is produced by the delivery of a pressure impulse from the pump which is then transmitted through the continuous column of fluid extending from the pump through the distributor, and through the injector to the nozzle.

By moving the retard lever in my construction, when the engine is running at normal speeds and subjected to intermediate or normal peak torque in such a fashion that an injection period is initiated before the occurrence of the impulse from the pump, the above defined multiple impulse injection may be secured.

At this point it may be well to note that the capacity of the reservoir in the distributor is approximately twice the volume of each fuel injection under normal operating conditions of the engine. The pressure in the reservoir which, incidently, is controlled by an axial movement of the sleeve, which likewise, defines the duration of injection due to the tapered character of the slots formed in the spindle, is effective to project a fine charge of fuel through the grooves provided in the valve seat of the nozzle. This fine injection occurring when the piston is closest to dead center, upon combustion, consumes the oxygen available in that portion of the combustion chamber closest to the nozzle. The injection of fuel under the second impulse delivered from the pump is effective to unseat the nozzle valve sufficiently to project a solid stream or sheet of fuel with increased velocity through the blanket of spent gases and into the area of unconsumed oxygen on top of the piston head.

It is also well to note that the character of the two pressure impulses, i. e., those delivered from the reservoir and the pump are opposed in the manner in which the pressure varies, i. e., the pressure of the impulse from the reservoir is greatest upon initiation and then gradually decreases; whereas, the pressure of the impulse delivered from the pump builds up to a maximum value.

Figure 16:
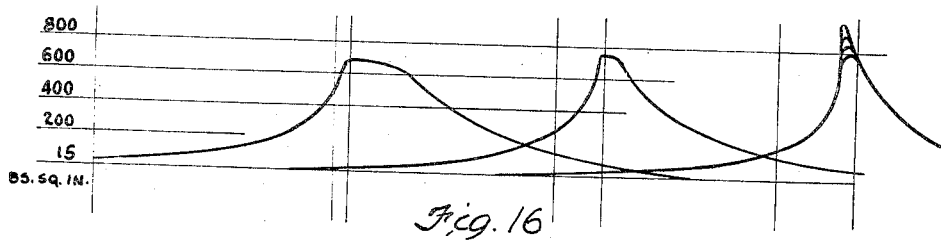

When the engine is operating under intermediate speed and torque characteristics, the multiple impulse type of injection produces an indicator card diagram such as is shown in the intermediate position on Fig. 16. The first impulse from the reservoir will be initiated ahead of dead center by an interval slightly greater than the combustion lag of the particular fuel being consumed. In order to accommodate the apparatus to different combustion lag intervals for different fuels, the only thing necessary is to make a slight adjustment of the retard lever.

High speed low torque operation

In the operation of Diesel engines at high speed, this most essential point must be kept in mind: As the engine is speeded up, the period permitted by the engine for the complete combustion of the fuel is accordingly reduced and the period available in which to extract the power from the fuel oil is reduced inversely with respect to the speed of the engine. For high speed operation, therefore, it is impractical to attempt to secure a multiple impulse injection but for efficiency of operation, it is necessary that the fuel be supplied in a single impulse preferably having maximum pressure at the time of initiation. When all of the charge is introduced by means of a single impulse, the rate of burning of the fuel taken with the rate of recession of the piston prevents the occurrence of extraordinarily high pressures which would occur under slow speed operation, were all the fuel injected at once and the piston did not recede fast enough to prevent the building up of this high pressure. For high speed low torque operation, therefore, it is essential that the fuel be supplied by means of a single impulse injection and accordingly, the retard handle of the distributor will be adjusted so that the injection is substantially entirely supplied by the spring loaded plunger acting on the fuel in the reservoir.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:—

1. The method of injecting a fuel charge into the combustion chamber of a Diesel engine, which comprises subjecting an impounded quantity of fuel under pressure to intermittent pressure impulses, venting a quantity of such impounded fuel to the combustion chamber during injection periods which occur in predetermined timed relation to said pressure impulses, and varying the phase relation between said pressure impulses and injection periods to vary the character of the injection.

2. The method of injecting fuel into the combustion chamber of a Diesel engine, which comprises impounding a quantity of fuel under spring pressure, subjecting such impounded fuel to intermittent pressure impulses, venting quantities of such impounded fuel to the combustion chamber during injection periods which occur in predetermined timed relation to said pressure impulses and varying the phase relation between said pressure impulses and injection periods to vary the character of the injection.

3. The method of injecting fuel into the combustion chamber of a Diesel engine, which comprises impounding a quantity of fuel under pressure, subjecting such impounded fuel to intermittent pressure impulses which occur in fixed time relation to the engine cycle, venting quantities of such impounded fuel to the combustion chamber during injection periods which occur at intervals occurring in overlapping relation with said pressure impulses, and varying the phase relation between said pressure impulses and injection periods to vary the character of the injection.

4. In a fuel supply apparatus for internal combustion engines having injector valves mounted in communication with the cylinders thereof, the combination of a fuel reservoir wherein the fuel is, at all times, subjected to pressure of the character provided by a deformed spring, means for supplying fuel to said reservoir under intermittent pressure impulses, and means for periodically venting fuel from said reservoir to said injector valves, said last-named means adjustable to vary the phase relation between said pressure impulses and said injection periods.

5. In a fuel supply apparatus for internal combustion engines having injector valves mounted in communication with the cylinders thereof, the combination of a fuel reservoir wherein the fuel is, at all times subjected to pressure of the character provided by a deformed spring, means for supplying fuel to said reservoir under intermittent pressure impulses, and means for periodically venting fuel from said reservoir to said injector valves in timed relation with said pressure impulses, said last-named means adjustable to vary the phase relation between said pressure impulses and said injection periods.

6. In a fuel supply apparatus for an internal combustion engine having spray valves responsive to pressure variations in communication with the cylinders of said engine, the combination of a fuel pump delivering a fixed charge of fuel for each power stroke of each piston in said engine, and a combined accumulator and diverter adapted to deliver a measured portion of each of such pump deliveries to said spray valves during relatively short periods and in proper sequence, said accumulator and diverter being adjustable during operation to concurrently measure the portion to be delivered and regulate the pressure and duration of said deliveries to said spray valves and separately adjustable during operation to vary the phase relation of said deliveries from said diverter to the engine cycle.

7. In a fuel supply apparatus for internal combustion engines having spray valves in communication with the cylinders thereof, the combination of a fuel pump adapted to deliver impulses of fuel under pressure, and means for delivering such fuel under pressure during relatively short intervals to said respective spray valves, said last named means including relatively movable valving means adjustable with respect to each other in such manner that fuel passages therein may, at a given speed of operation of the engine, coincide at different times and for different intervals to vary the duration of said delivery intervals to said spray valves and the phase relation between the occurrence of such intervals and the movement of the pistons in said cylinders.

8. In a fuel supply apparatus for internal combustion engines having spray valves in communication with the cylinders thereof, the combination of a fuel pump adapted to deliver impulses of fuel under pressure, and means for delivering such fuel under pressure during relatively short intervals to said respective spray valves, said last named means including relatively movable valving means adjustable with respect to each other in such manner that fuel passages therein may, at a given speed of operation of the engine, coincide at different times and for different intervals to vary the pressure at which said deliveries are made to said valves by augmenting the pressures delivered from said pump and to vary the phase relation between such delivery intervals and the movement of the pistons in said cylinders.

9. In a fuel supply apparatus for an internal combustion engine having an injector in each cylinder, an accumulator for fuel under pressure, a distributor adapted to supply through each injector in predetermined order a charge of fuel from said accumulator, and a pump adapted to deliver impulses augmenting the pressure of said accumulator on each injection, said charges of fuel being deliverable by said distributor in controlled cyclic relation to said pump impulses.

10. In a fuel supply apparatus for an internal combustion engine having an injector in each cylinder, an accumulator for fuel under pressure, means adapted to supply a charge of fuel from said accumulator through each of said injectors in a predetermined order, and a pump adapted to supply a charge of fuel to said accumulator at least in part coincidentally with said charge supplied through said injector, said means being adjustable to supply injector charges in controlled cyclic relation to the charges synchronously supplied to the accumulator by the said pump.

11. As an element in a fuel supply system for internal combustion engines, a combined accumulator and diverter comprising a body provided with a cylindrical bore, a rotatably and axially movable cylindrical sleeve mounted in close-fitting engagement in said bore, a spindle adapted to be rotatably driven from the engine extending into one end of said sleeve, and an axially movable spring loaded plunger extending into the other end of said sleeve, said sleeve apertured to receive fuel from a pump into the space between said plunger and spindle, an overflow relief port in said sleeve normally covered by said spring loaded plunger but adapted to be uncovered as said plunger is moved responsive to pressure generated in said space between said plunger and spindle by said pump, said spindle provided with a groove or passage adapted upon relative rotation of said spindle and sleeve to successively place the space between said spindle and plunger in communication with a plurality of discharge apertures in said sleeve, said body being provided with the necessary apertures to permit ingress and egress of the fuel through the apertures in said sleeve.

12. A system for injecting fuel into the combustion chamber of an internal combustion engine which comprises: a pump driven from the engine and delivering a fixed quantity of fuel for each power stroke of each piston in fixed synchronism with the engine cycle; a combination accumulator and diverter comprising a body provided with a cylindrical bore and the necessary apertures to permit ingress and egress of fuel, a rotatably and axially movable cylindrical sleeve mounted in close-fitting engagement in said bore, a spindle adapted to be rotatably driven from the engine and extending into one end of said sleeve, and an axially movable spring loaded plunger extending into the other end of said sleeve, said sleeve apertured to receive fuel through an aperture in said body from said pump into the space between said plunger and said spindle, an overflow or relief port or ports in said sleeve normally covered by said spring loaded plunger but adapted to be uncovered as said plunger is moved responsive to pressure generated in said space between said plunger and said spindle by said pump thus providing a pressure limiting device together with a means for impounding a measured portion of said pump delivery under pressure, said sleeve provided with one aperture for each cylinder of said engine disposed about said spindle and said spindle provided with a groove or passage adapted upon relative rotation of said spindle and said sleeve to place the space between said spindle and said plunger in communication through apertures in said body with the spray valves in proper sequence and in adjustable phase relationship with said pump deliveries; a spray valve in each cylinder of said engine with an orifice variable responsive to pressure variations.

13. As an element in a fuel supply system for internal combustion engines, a combined accumulator and diverter comprising a body provided with a cylindrical bore, a rotatably and axially movable cylindrical sleeve mounted in close-fitting engagement in said bore, a spindle adapted to be driven from the engine extending into one end of said sleeve, and an axially movable spring loaded plunger extending into the other end of said sleeve, said sleeve apertured to receive fuel under pressure in the space between said plunger and spindle, an overflow relief port in said sleeve normally covered by said spring loaded plunger but adapted to be uncovered as said plunger is moved responsive to fuel pressure in said space between said plunger and spindle, said sleeve provided with a plurality of circumferentially spaced apertures about said spindle, and said spindle provided with a groove adapted upon relative rotation of said spindle and sleeve to place the space between said spindle and plunger in communication with said last-named apertures.

14. The method of injecting a fuel charge into the combustion chamber of an internal combustion engine, which comprises subjecting an impounded quantity of fuel under pressure to intermittent pressure impulses which occur in fixed time relation to the engine cycle; venting a quantity of such impounded fuel to the combustion chamber during injection periods which occur in timed relation to said pressure impulses; varying the phase relation between said pressure impulses and injection periods to vary the character of the injection; and, varying the pressure on such impounded fuel.

15. The method of injecting fuel into the combustion chamber of an internal combustion engine, which comprises impounding a quantity of fuel under spring pressure; subjecting such impounded fuel to intermittent pressure impulses which occur in fixed time relation to the engine cycle; venting quantities of such impounded fuel to the combustion chamber during injection periods which occur in timed relation to said pressure impulses; varying the phase relation between said pressure impulses and injection periods to vary the character of the injection; and, varying the pressure on such impounded fuel.

16. The method of injecting fuel into the combustion chamber of an internal combustion engine, which comprises impounding a quantity of fuel under pressure; subjecting such impounded fuel to intermittent pressure impulses which occur in fixed cyclic relation to the engine cycle; venting quantities of such impounded fuel to the combustion chamber during injection periods which occur in adjustable cyclic relation to said pressure impulses; varying the cyclic relation between said pressure impulses and injection periods to vary the character of the injection; and, varying the pressure on such impounded fuel.

17. In a fuel apparatus for internal combustion engines having spray valves in communication with the cylinders thereof, the combination of a fuel pump adapted to deliver fuel by impulses in fixed time relation to the engine cycle; means adapted to receive and store under pressure a portion of the pump delivery; means adapted to limit the pressure of such impulses; and means for delivering quantities of the fuel so stored under pressure during relatively short intervals to said spray valves in proper sequence, said last-named means comprising a sleeve member with apertures adapted to convey fuel to said spray valves and a plug fitted within said sleeve member rotatably driven by the engine and having a passage communicating with said stored fuel and sequentially registering with the apertures in said sleeve, said sleeve being axially rotatable whereby the phase relation is adjusted between registration of said apertures with said passage and the impulses delivered by said pump.

18. In a fuel apparatus for internal combustion engines having spray valves in communication with the cylinders thereof, the combination of a fuel pump adapted to deliver fuel by impulses in fixed time relation to the engine cycle; means adapted to receive and store under pressure a portion of the pump delivery; means adapted to limit the pressure of such impulses; and means for delivering quantities of the fuel so stored under pressure during relatively short intervals to said spray valves in proper sequence, said last-named means comprising a spindle rotatably driven from the engine and a closely fitted sleeve rotatably adjustable thereabout, said sleeve having apertures communicating with such spray valves, and said spindle having a groove or passage so positioned that it successively registers with said apertures as said spindle is rotated, said groove or aperture being in communication with said means for storing fuel under pressure, and means adapted to adjustably rotate said sleeve whereby the phase relation between said intervals of fuel delivery and said pump impulses is varied.

19. In a fuel apparatus for internal combustion engines having spray valves in communication with the cylinders thereof, the combination of a fuel pump adapted to deliver fuel by impulses in fixed time relation to the engine cycle; means adapted to receive and store under pressure a portion of the pump delivery; means adapted to limit the pressure of such impulses; and means for delivering quantities of the fuel so stored under pressure during relatively short intervals to said spray valves in proper sequence, said last named means including apertured members one of which is rotatably adjustable in relation to the other to vary the registration of the apertures whereby the phase relation between impulses delivered by the pump and said short intervals of discharge is varied.

20. In a fuel apparatus for internal combustion engines having spray valves in communication with the cylinders thereof, the combination of a fuel pump adapted to deliver impulses in timed relation to the engine cycle; means for holding under pressure a portion of the fuel delivered by said pump and subjecting same to the impulses thereof; means whereby said pressure and said impulses deliver to the spray valves measured quantities of the fuel, so held, in proper sequence; and means adapted to vary the phase relation of the deliveries of such measured quantities to the impulses delivered by said pump.

21. In a fuel apparatus for internal combustion engines in combination, spray valves in communication which the engine cylinders, said valves having means adapted to modify the discharge orifices responsive to pressure of fuel fed thereto; a pump adapted to deliver fuel under pressure impulses in timed relation to the engine cycle; means for holding under pressure a portion of the fuel delivered by said pump and subjecting it to the impulses thereof; means for delivering measured quantities of said fuel under said pressure and said impulses during relatively short intervals to said spray valves in proper sequence; and means adapted to vary the phase relation of said short intervals to the impulses delivered by said pump.

22. In a fuel apparatus for internal combustion engines having spray valves in communication with the cylinder thereof, the combination of a fuel pump driven by said engine and adapted to deliver impulses in definite time relation to the engine cycle; means for retaining under adjustable pressure a portion of the pump delivery; and means for delivering measured quantities of such retained delivery under pressure during relatively short intervals to said spray valves in proper sequence, said last named means adjustable to vary the phase relation of said short intervals to the impulses delivered by said pump.

23. In a fuel injection system for internal combustion engines, in combination, a pump delivering fuel impulses which occur in timed relation to the engine cycle and at least once for each power stroke of the engine, said fuel deliveries in each impulse being in excess of the engine's normal requirements for a power stroke; an accumulator connected with said pump and adapted to hold fuel, so delivered by said impulses, under the adjustable pressure of an elastic load; and a distributing and timing valve adjustably adapted to vent fuel to an injector in a cylinder of such engine for a period of variable duration and in variable timed relation to the engine cycle.

24. The method of injecting fuel into the combustion chamber of an internal combustion engine, which comprises impounding a quantity of fuel under pressure; subjecting such impounded fuel to intermittent pressure impulses which occur in fixed time relation to the engine cycle; venting quantities of such impounded fuel to the combustion chamber cyclically and in overlapping relation with said pressure impulses and, varying the pressure on such impounded fuel.

RICHARD W. HAUTZENROEDER.